April 15, 1941.  E. R. DURGIN  2,238,556
OPHTHALMIC MOUNTING
Filed Feb. 27, 1940

INVENTOR.
Edgar R. Durgin,
BY George D. Richards
ATTORNEY.

Patented Apr. 15, 1941

2,238,556

UNITED STATES PATENT OFFICE 2,238,556

OPHTHALMIC MOUNTING

Edgar R. Durgin, Maplewood, N. J., assignor to New Jersey Optical Co., Irvington, N. J., a corporation of New Jersey Application February 27, 1940, Serial No. 321,011

3 Claims. (Cl. 88—47)

This invention relates to improvements in ophthalmic mountings of the rimless spectacle frame type.

This invention has reference, more particularly, to a rimless spectacle frame structure including a bridge and associated noseguard elements, which are secured by lens embracing straps to and between the opposed and spaced inner end marginal portions of the lenses, and concealed temple mounting arms or bars which have their inner ends rigidly united to the bridge structure adjacent to the lens embracing straps thereof, so as to extend coincident to and behind the upper marginal portions of the lenses to a point adjacent to the outer ends of the latter, there terminating in temple hinging end pieces to which the temple bows are pivotally connected in the usual manner.

Frame structures of the kind mentioned, although they provide a desired rimless appearance, and, by reason of the provision of the temple mounting arms or bars, avoid the necessity of conspicuously anchoring the temple bows directly to the outer ends of the lenses, nevertheless possess the disadvantage that the stresses and strains incident to manipulation of the temple bows in donning or removing the spectacles, as well as during wear thereof, are directly transmitted to the lens straps and thus to the parts of the lenses embraced by the latter, so that risk of breakage of the lenses at such points is substantial. Furthermore, the considerable length of the temple mounting arms or bars involves a tendency to vibration which increases the stresses and strains to which the structure is subject, while also tending to develop in the wearer a feeling of insecurity.

Having these disadvantages in mind, it is an object of this invention to provide, in combination with rimless frame structures of the kind mentioned, a means for positively coupling the free end portions of the temple mounting arms or bars to the lenses, whereby said arms or bars are rendered resistant to vibration, and so that any developed stresses and strains are not transmitted solely to a single point of the lenses but are distributed to a plurality of points thereof so as to diminish and dissipate the same, with consequent lessening of risk of lens breakage. To this end, the instant invention provides a separable easily applied coupling clip device, which may be selectively positioned to spring from a desired point behind and in the top marginal areas of the lenses so as to embrace the temple mounting arms or bars with supporting and stabilizing effect.

The invention has for a further object to provide a novel coupling clip device in combination with a rimless eyeglass frame structure of the kind mentioned which, as operatively assembled with the latter, is substantially concealed behind the lenses, and consequently, as in the case of the temple mounting arms or bars themselves, are desirably inconspicuous.

Other objects of this invention, not at this time more particularly enumerated, will be understood from the following detailed description of the same.

An illustrative embodiment of the invention is shown in the accompanying drawing, in which—

Similar characters of reference are employed in the above described views, to indicate corresponding parts.

Figure 1:
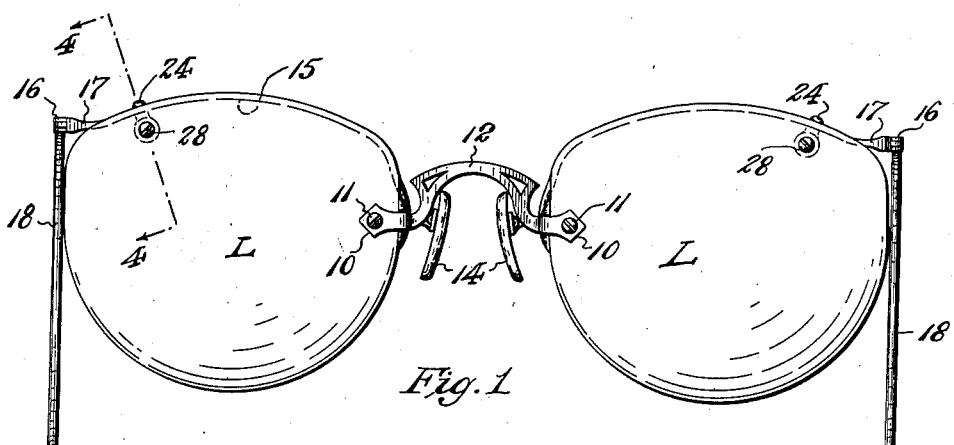
Fig. 1 is a front face view of an ophthalmic mounting constructed in accordance with this invention.
Figure 2:
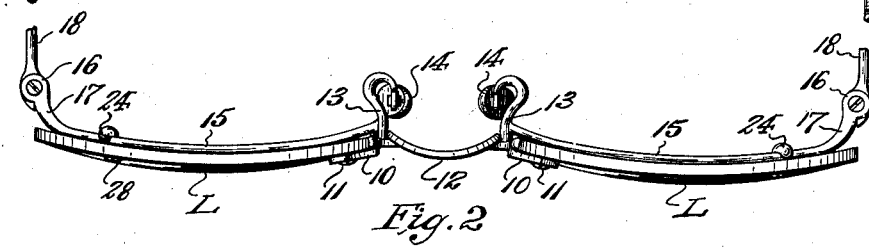
Fig. 2 is a top edge view of the same.
Figure 3:
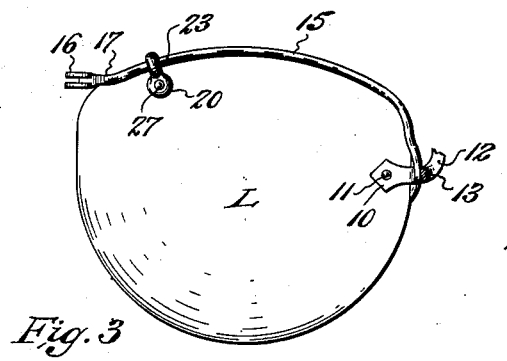
Fig. 3 is a fragmentary rear face view thereof.
Figure 5:
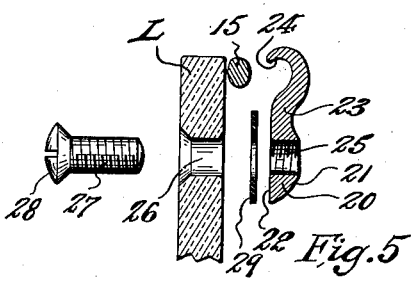
Fig. 5 is a view similar to that of Fig. 4, but with the parts of the coupling clip structure disassembled.
Figure 4:
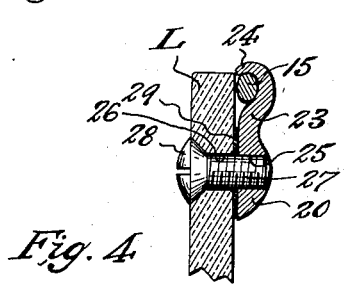
Fig. 4 is a cross sectional view, taken on line 4—4 in Fig. 1, but drawn on a considerably enlarged scale.

As shown in the drawing, the novel rimless spectacle frame comprises strap elements 10 which straddle the marginal portions of the inner ends of the lenses L, being secured thereto by fastening screws 11, or in any other suitable or well-known manner. Affixed to and extending between the butt portions of said strap elements 10 is a bridge piece 12. Also affixed to the respective butt portions of the strap elements, preferably at the junctures thereof with the bridge piece 12, are rearwardly extending bracket members 13 of noseguard structures, to the extremities of which are suitably connected the nose engaging pads 14 of said structures.

Affixed to the noseguard bracket members 13, adjacent to the rear sides of the strap elements 10, are temple mounting arms or bars 15. These temple mounting arms or bars 15 are arranged to extend outwardly behind and along the upper marginal portions of the lenses L, and substantially parallel thereto; the same being shaped to conform to the peripheral contour of the upper edges of said lenses. At their outer extremities, said temple mounting arms or bars 15 terminate in temple hinging end pieces 16, which are preferably connected with the temple mounting arms or bars by laterally and rearwardly offsetting curved portions 17 into which the outer extremities of said temple mounting arms or bars are formed. The temple bows 18 of the spectacle frame are suitably pivotally connected to said hinging end pieces 16 in such manner that the same may be folded, from operative rearwardly extending positions, inwardly across the rear faces of the lenses L, when the spectacle frame is removed and collapsed by the wearer for insertion in a carrying case or otherwise disposed of when not in use.

The novel means for positively coupling the free end portions of the temple mounting arms or bars 15 to the lenses, with reenforcing or bracing effect and so as to obtain the advantages of non-vibratory and stress and strain dissipating connection of said arms or bars relative to the lenses, of which mention has been made above, comprises a base member 20 of suitable conformation, preferably of circular peripheral shape having a rearward outer side 21 of rounded or semispherical contour and a flat front or inner face 22. Extending radially from said base member, and formed therewith as an integral part thereof, is a clip finger 23, which terminates at its free end in a hook-like coupler element 24. Extending axially through said base member 20 is an internally screw threaded opening or bore 25.

To apply the coupling and reenforcing means to a lens L for operative engagement with a temple mounting arm or bar 15, the lens L is drilled, at a desired point along its upper marginal portion, so as to provide an opening 26 therethrough. The base member 20 is applied to the rear face of a lens L with its flat front or inner face 22 contiguous thereto, and so that its threaded bore 25 is axially aligned with said opening 26 of the lens. The base member 20, when so applied, is so positioned that the clip finger 23 will extend upwardly toward the temple mounting arm or bar 15, with the hook-like coupler element 24 extending over the rearward exposed side of said arm or bar, and so that the latter is embraced by the bight of said element. When the parts are so disposed, the threaded shank 27 of a fastening screw is passed through the opening 26 of the lens L and screwed into the bore of said base member 20 until the head 28 of said screw abuts the outer face of the lens and said base member 20 is drawn tightly home against the rearward face of the latter, with the clip finger 23 and its hook-like coupler element 24 firmly engaged in embracing and holding relation to the adjacent portion of temple mounting arm or bar 15. If desired, a cushioning washer 29 of any suitable and preferably resilient material may be interposed between the base member 20 and the contiguous rear face portion of the lens L. It will also be obvious that a similar cushioning washer could, if desired, likewise be interposed between the head 28 of the fastening screw and the contiguous front face portion of the lens L.

It will be seen that the novel coupling means, being a structure separable from the temple mounting arm or bar, may be variously positioned at any desired point relative to said arm or bar and the top edge of the adjacent lens, and consequently the disposition thereof may be selected to readily accommodate itself to lenses of various peripheral shapes, and at a selected point to suit the taste of the wearer as well as to harmonize with the general make-up and appearance of the frame as a whole.

Figure 6:
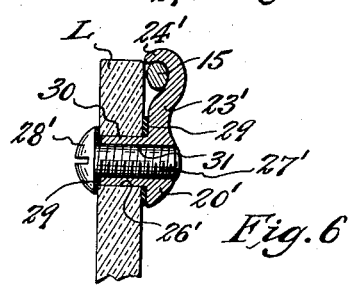
Fig. 6 is a view similar to that of Fig. 4, but showing a somewhat modified form of the coupling clip structure.

Referring to Fig. 6, there is shown therein a somewhat modified form of the novel coupling and reenforcing means of this invention, the same comprising a base member 20' carrying the radially projecting clip finger 23' having the hook-like coupler element 24' to embracingly engage and hold the temple mounting arm or bar 15. Formed integrally with the base member 20' to project forwardly from its forward flat face is a central stud or post 30, through which axially extends an internally screw threaded bore 31. In assembling this form of the coupling, the lens L is drilled to provide the suitably located opening 26', whereupon the stud or post 30 is inserted into such opening from the rear until the base member 20' is stopped against the rear face of the lens, with the clip finger 23' and its hook coupler element 24' operatively engaged with the temple mounting arm or bar 15. When the parts are so arranged, the threaded shank 27' of a fastening screw is screwed into the stud or post bore until the screw head 28' abuts the front face of the lens, thus firmly securing the various parts in operative assembled relation. If desired, cushioning washers 29 may be interposed between the base member 20' and lens, or between the fastening screw head 28' and lens, or both. In this modified form of the novel coupling means, the provision of the stud or post 30 not only affords a sturdier construction, but, by reason of the length of internally screw threaded bore possessed thereby, also assures a firmer and stronger engagement of the base member 20' by the fastening screw.

Having described my invention, I claim:

1. In combination with a rimless spectacle construction having a central bridge structure secured by straps to the opposed inner ends of a pair of lenses and including temple mounting bars affixed to said bridge structure to extend outwardly therefrom coincident to and behind the upper marginal portions of said lenses, a separable coupling means secured to the upper marginal portion of each lens beneath the associated temple mounting bar at a selected point intermediate the ends of the latter, each coupling means comprising a base member contiguous to the rear face of the lens and secured to the lens by a screw passing therethrough from the front thereof to screw into an internally threaded opening with which said base member is provided, and an upwardly extending clip finger integral with said base member and adapted to engage externally across and behind said adjacent temple mounting bar, said clip finger terminating in a hook-like element the bight of which embraces and holds said bar against substantial movement relative to the lens margin.

2. In combination with a rimless spectacle construction having a central bridge structure secured by straps to the opposed inner ends of a pair of lenses and including temple mounting bars affixed to said bridge structure to extend outwardly therefrom coincident to and behind the upper marginal portions of said lenses, a separable coupling means between the upper marginal portion of each lens and the adjacent temple mounting bar, each coupling means comprising a base member contiguous to the rear face of the lens below the adjacent temple mounting bar, said base member having a projecting stud provided with an internally screw threaded bore, said stud being adapted to be entered in an opening with which the upper marginal portion of the lens is provided, a fastening screw to engage through said lens opening from the front of the lens and to screw into the bore of said stud thereby to secure said base member to the lens, and a clip finger integral with said base member to project upwardly therefrom and externally across said adjacent temple mounting bar, said clip finger terminating in a hook-like element the bight of which embraces and holds said bar against substantial movement.

3. A rimless spectacle construction as defined in claim 2, wherein cushioning means is interposed between lens contacting parts of said coupling means and the lens.

EDGAR R. DURGIN.